United States Patent
Hanson et al.

(10) Patent No.: US 6,320,894 B1
(45) Date of Patent: Nov. 20, 2001

(54) HIGH ENERGY Q-SWITCHED 0.9 μM LASER

(75) Inventors: Frank E. Hanson; Peter M. Poirier, both of San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/252,610

(22) Filed: Feb. 4, 1999

(51) Int. Cl.[7] .................................................. H01S 3/08
(52) U.S. Cl. .............................. 372/105; 372/10; 372/27; 372/106
(58) Field of Search ................................. 372/106, 105, 372/98, 92, 10, 12, 26, 27

(56) References Cited

U.S. PATENT DOCUMENTS

| | | |
|---|---|---|
| 3,866,139 | * 2/1975 | Currie .................................. 331/94.5 |
| 4,305,046 | 12/1981 | Le Floch et al. . |
| 4,310,808 | * 1/1982 | Byer et al. ........................... 331/94.5 |
| 4,360,925 | * 11/1982 | Brosnan et al. ........................ 372/95 |
| 4,709,368 | 11/1987 | Fukuda et al. . |
| 4,752,931 | 6/1988 | Dutcher et al. . |
| 4,772,104 | * 9/1988 | Buhrer ................................. 350/403 |
| 4,796,262 | 1/1989 | Michelangeli et al. . |
| 5,263,038 | 11/1993 | Lukas et al. . |
| 5,640,412 | * 6/1997 | Reed .................................... 372/100 |
| 5,657,341 | 8/1997 | Hyuga . |
| 5,671,240 | 9/1997 | Okazaki . |
| 5,809,048 | 9/1998 | Shichijyo et al. . |
| 5,838,701 | 11/1998 | Deutsch et al. . |

\* cited by examiner

*Primary Examiner*—Teresa M. Arroyo
*Assistant Examiner*—Davienne Monbleau
(74) *Attorney, Agent, or Firm*—Harvey Fendelman; Peter A. Lipovsky; Michael A. Kagan

(57) ABSTRACT

A Q-switched neodymium laser may be operated in the 0.9 μm [($\lambda_1$)] band at relatively high gain levels. The laser uses a birefringent filter which provides selective discrimination for wavelengths near 1 μm [($\lambda_2$)] and prevents parasitic lasing in that wavelength region. The filter includes a specific wavelength dependent crystal quartz wave plate in combination with a linear polarizer. The linear polarizer is placed between two mirrors which define a laser cavity. The wave plate provides exactly 2 full waves of retardation at the desired wavelength $\lambda_1$ in the 0.9 μm band, and exactly 1.75 waves of retardation at wavelength $\lambda_2$ near the center of the 1 μm band for one pass. A Q-switching device such as a Pockels cell is positioned in the laser cavity to selectively control a pulsed emission at $\lambda_1$.

13 Claims, 3 Drawing Sheets

HIGH ENERGY Q-SWITCHED 0.9 μM LASER

BACKGROUND OF THE INVENTION

The present invention generally relates to lasers, and more particularly, to a neodymium laser tuned to emit pulsed light having a wavelength of about 0.9 μm using an optical filter that includes a polarizer and wave plate in the optical resonant cavity of the laser which selectively provides loss for wavelengths in the 1 μm band.

It is relatively easy to optically pump the $^4F_{3/2}$ level of trivalent neodymium doped into various host materials using either flash lamps or more recently, laser diodes. A population inversion between the $^4F_{3/2}$ level and the lower $^4I_{9/2}$, $^4I_{11/2}$, and $^4I_{13/2}$ levels can be readily obtained and laser emission between these levels has been demonstrated. The specific emission wavelengths depend on the host material and are typically near 0.9 μm, 1 μm, and 1.3 μm, respectively. The peak effective cross section is also host dependent and is typically about 10×times larger in the 1 μm band. than in the 0.9 μm band. Since these transitions all originate from the same upper level, the relative gain in a particular host at each of these wavelengths is fixed.

A neodymium laser is typically operated in the 0.9 μm band by using wavelength selective elements inside the laser cavity to suppress the stronger 1 μm band emissions. Reflective mirror coatings are designed to provide the required feedback at the desired wavelength and to be highly transmissive over the 1 μm band. This approach is generally adequate when the gain is not large such as the case with continuous wave or long pulse lasers. However, as the inversion increases, more loss is required over the 1 μm band in order to prevent parasitic lasing at that wavelength. This becomes more important with Q-switched operation. The degree of wavelength selective discrimination in the laser cavity effectively sets an upper limit on the energy which can be stored in the laser material.

At present, there do not exist adequate methods to provide the necessary wavelength discrimination for high power Q-switch operation of neodymium lasers in the 0.9 μm band. A number of standard approaches are available for general wavelength selection in lasers. Reflective coatings designed to give the best discrimination possible against unwanted wavelengths are generally used but it is difficult to design coatings to discriminate between closely spaced wavelengths. Other common techniques are also deficient for use in generating a high energy, Q-switched output light at 0.9 μm from a neodymium laser. For example, it is difficult to obtain sufficient wavelength dispersion using refractive elements such as prisms inside the laser cavity. Also, diffraction gratings generally cannot handle high power and tend to introduce significant loss for all wavelengths. Absorption filters which exhibit high transmission at 0.9 μm and sufficient absorption over the entire 1 μm band are not available. Generic birefringent tuning elements are routinely used for wavelength tuning of low-gain lasers. These devices consist of multiple crystal quartz plates having integral multiples of a common thickness. They allow convenient wavelength tuning by plate rotation but are not able to provide the necessary discrimination over the entire 1 μm band. Therefore, a need exists for an intracavity filter which efficiently suppresses 1 μm band laser action and allows efficient operation of Q-switched laser operation in the 0.9 μm band.

SUMMARY OF THE INVENTION

The present invention provides a Q-switched neodymium laser that emits optical energy in the 0.9 μm band at relatively high gain levels. The invention uses a birefringent filter which provides selective discrimination for wavelengths near 1 μm and prevents parasitic lasing in that wavelength region. The filter includes a specific wavelength dependent crystal quartz wave plate in combination with a linear polarizer. The linear polarizer is placed between two mirrors which define a laser cavity. The wave plate is designed to provide exactly 2 full waves of retardation at the desired wavelength $\lambda_1$ in the 0.9 μm band, and exactly 1.75 waves of retardation at wavelength $\lambda_2$ near the center of the 1 μm band for one pass. A Q-switching device, such as a Pockels cell, or acousto-optic cell is positioned in the laser cavity and selectively controls a pulsed output signal at $\lambda_1$.

In operation, $\lambda_1$ light linearly polarized along an axis $p_1$ selected by the polarizer is unaffected by a double pass through the wave plate and reflection from the polarizer. When in an "OFF" state, the Q-switch inhibits laser action until a large inversion and high gain are built up in the laser gain medium. Laser action at $\lambda_1$ begins when the Q-switch is switched to the "ON" state and a pulsed optical output signal is provided through one of the mirrors. Laser action at any of the relatively high gain spectral lines near 1 μm is prevented in part because of the loss added by the polarizer and wave plate filter. The specific additional loss due to the filter depends on the wavelength dependent loss of the polarizer for the polarization state orthogonal to axis $p_1$ and the wavelength dependent retardation characteristics of the wave plate. Since the wave plate is designed to be low-order and have only ¼ wave less retardation at $\lambda_2$ than at $\lambda_1$, near the middle of the group of 1 μm high gain lines, the filter has a spectrally broad loss centered at $\lambda_2$ which extends over the entire group of 1 μm spectral lines.

The invention includes a unique birefringent filter that includes a linear polarizer and crystal quartz compound wave plate. The filter enhances the operation of a Q-switched neodymium laser at 0.9 μm by suppressing all of the widely spaced high gain lines near 1 μm. The compound wave plate has the unique property of retarding $\lambda_1$ light by two waves and retarding spectral components near $\lambda_2$ by about 1.75 waves. The filter incorporated into the invention allows increased energy storage in the laser cavity before the onset of parasitic lasing in the 1 μm band and introduces minimal losses at the operating wavelength in the 0.9 μm band.

These and other advantages of the invention will become more apparent upon review of the accompanying drawings and specification, including the claims.

BRIEF DESCRIPTION OF THE DRAWINGS

Throughout the several views, like elements are referenced using like references.

DESCRIPTION OF THE PREFERRED EMBODIMENT

Figure 1:
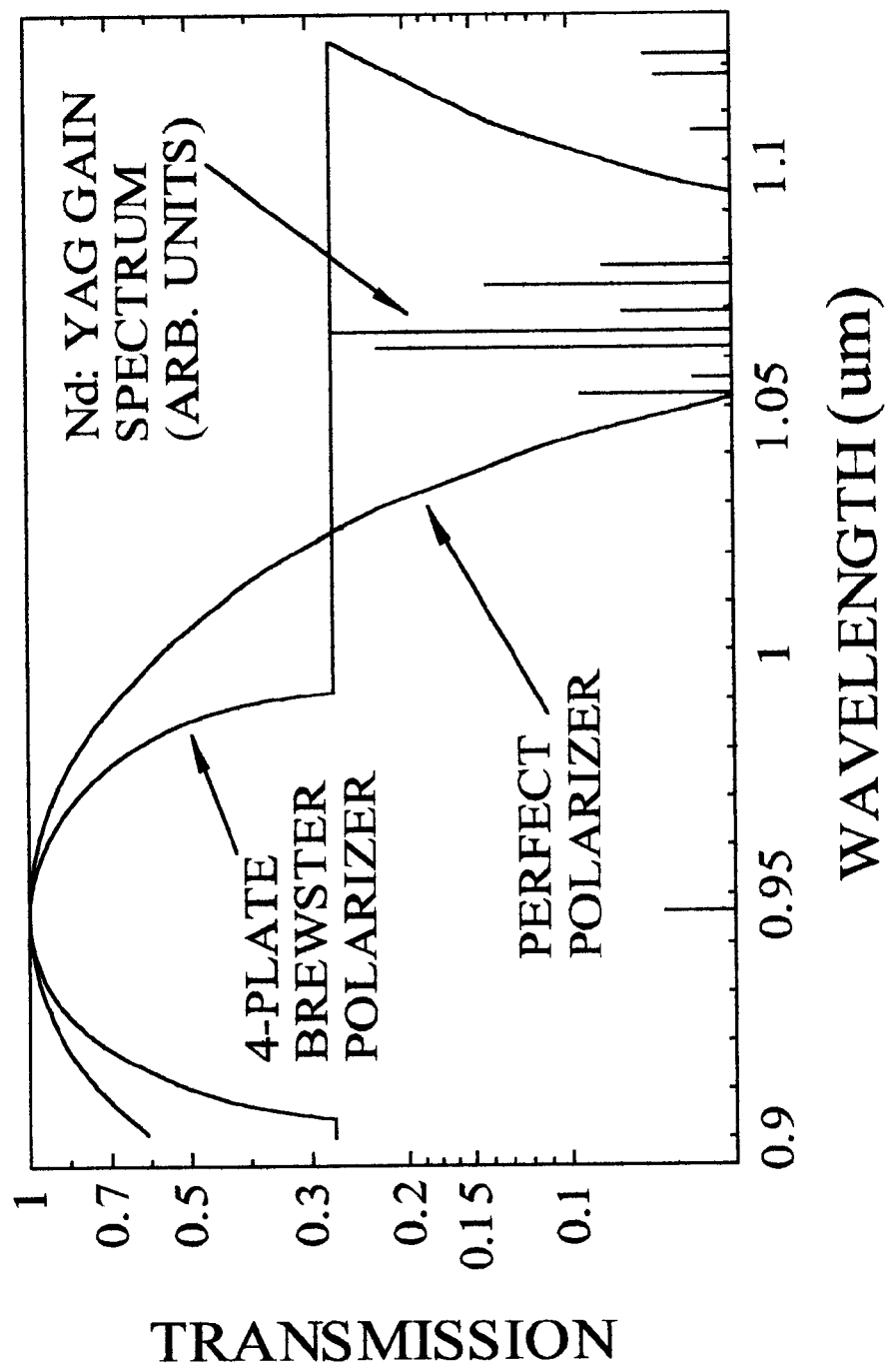
FIG. 1 is a graph that illustrates the relative gain spectrum of neodymium:YAG on a linear scale.

The present invention provides a Q-switched neodimium laser system that includes an optical filter which provides loss in the the 1 μm band, and provides high transmission for optical output in the 0.9 μm band. The laser system provides the important advantage of generating coherent light in the 0.9 µm band which when frequency doubled, is nearly optimal for transmission in Jerlov Ocean Types 1–3 over much of the world's surface. As shown in FIG. 1, neodymium-YAG lasers generate relatively high gain for wavelengths in the 1.05–1.08 µm band, and relatively low gain for wavelengths in the 0.9 µm band. FIG. 1 shows how the characteristics of the polarizer in the present invention incorporated in the laser cavity can provide loss and suppress the 1 µm band and provide high transmission for the 0.9 µm band. For example: a) curve 5 represents the effects on the round-trip cavity transmission caused by incorporating a 4-plate Brewster polarizer in the laser cavity of the invention; and b) curve 7 represents the effects on the round-trip cavity transmission caused by incorporating a perfect polarizer in the laser cavity of the invention.

Figure 2:
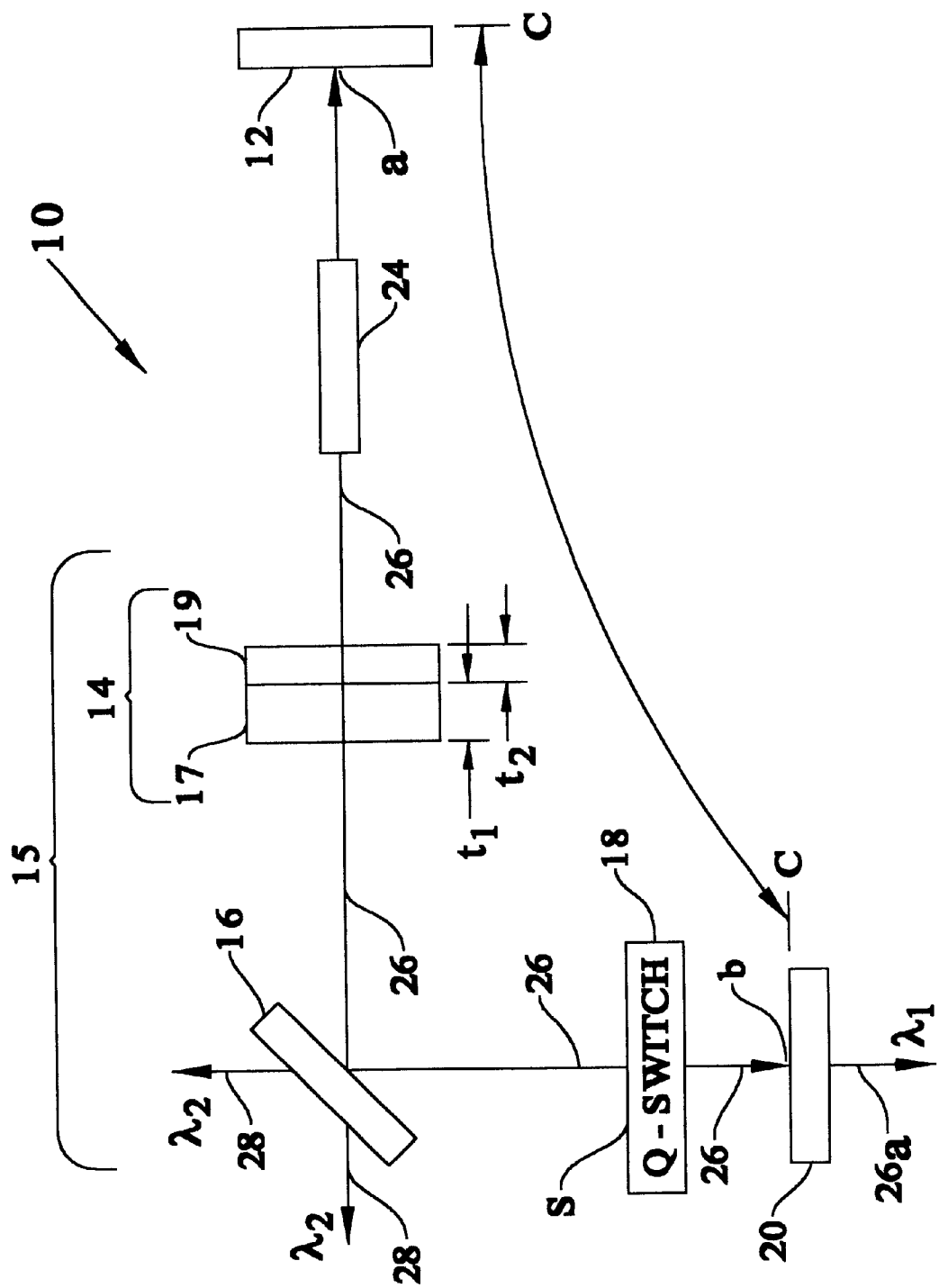
FIG. 2 illustrates a Q-switched 0.9 μm laser embodying various features of the present invention.
Figure 3:
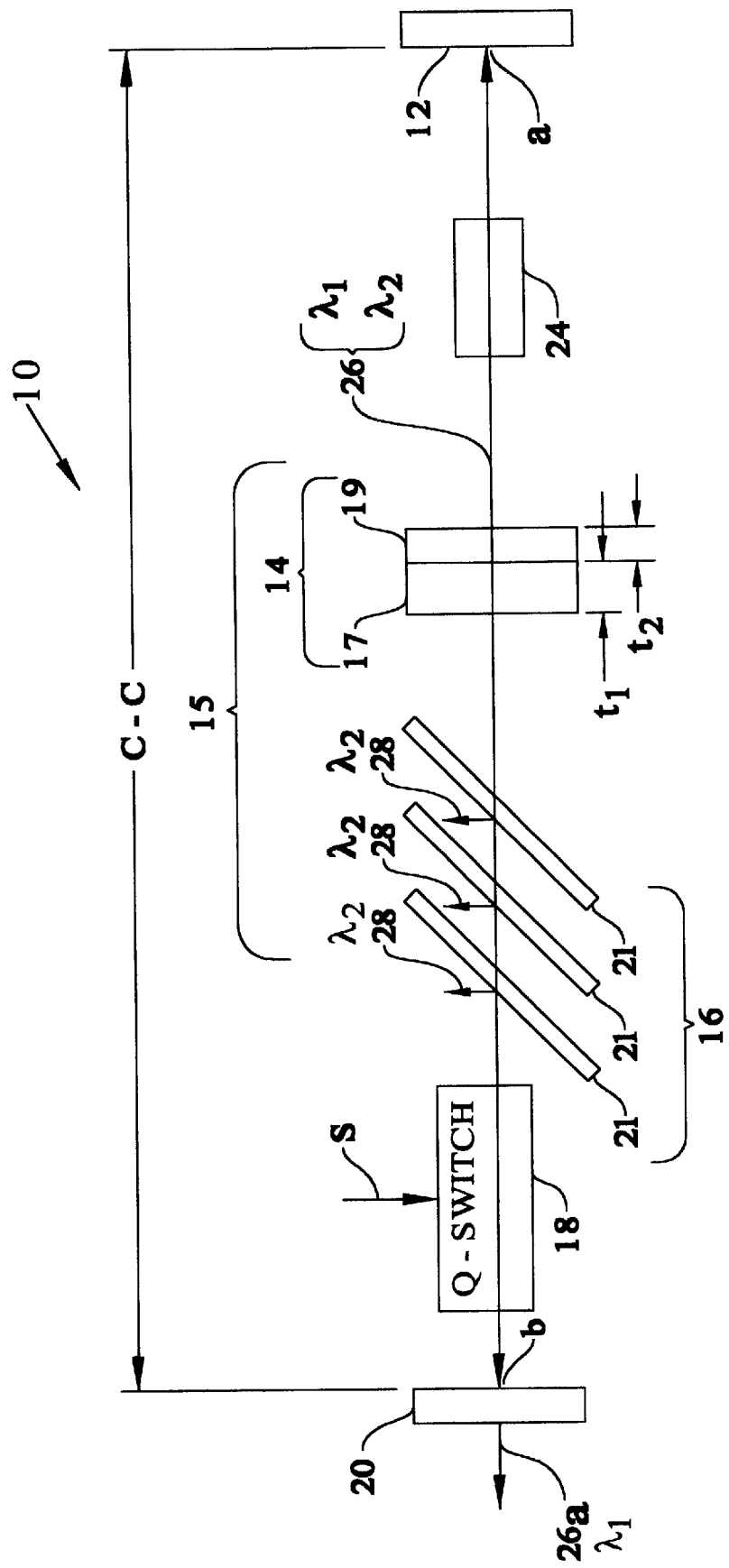
FIG. 3 shows an example of a Q-switched 0.9 μm laser having an optical filter which includes a transmissive polarizer.

Referring to FIG. 2, laser system 10 embodying various features of the present invention is shown to include a high reflective mirror 12, optical filter 15 comprising wave plate 14 and linear polarizer 16, Q-switch 18, partially reflective mirror 20, and crystal gain element 24. Linear polarizer 16 may be either a reflective element, as shown in FIG. 2, or transmissive as shown in FIG. 3, and defines a preferred axis $p_1$ of linear polarization within the laser cavity C-C defined by the optical resonant path a-b between mirrors 12 and 20. In FIG. 3, linear polarizer 16 may be implemented as one or more high quality glass plates 21 positioned at Brewster's angle with respect to optical resonant path a-b. In the preferred embodiment, gain element 24 may be implemented as neodymium:YAG. Q-switch 18 may be implemented as a Pockels cell, acousto-optic cell, rotating mirror, or any other device which may selectively prevent light from lasing in laser cavity C-C.

In general, gain element 24 provides gain to generate a light beam 26 comprised of a spectral component $\lambda_1$ in the desired 0.9 µm band, and undesired spectral components near the center of the 1 µm band at $\lambda_2$. Wave plate 14 is designed to provide exactly 2 full waves of retardation for each pass at the desired wavelength $\lambda_1$ in the 0.9 µm band, and exactly 1.75 waves of retardation at wavelength $\lambda_2$, near the center of the 1 µm group of higher gain lines for one pass through wave plate 14. When implemented as a Pockels cell, Q-switch 18 is in the "ON" or "OFF" state depending on the voltage level of input signal S. When the voltage level of S is low, $\lambda_1$ light component of light beam 26 resonates between mirrors 12 and 20 with relatively low losses. When the value of S is high, then the optical cavity C-C has high optical losses which prevents lasing at all wavelengths. Gain element 24 which is not birefringent preferably may be positioned along optical resonant path a-b and does not affect the polarization state of light in the optical cavity C-C. In the preferred embodiment, Q-switch 18 may be implemented as a Pockels cell and the polarizer 16 functions with the Pockels cell to allow the cavity Q to be switched from low to high. When a voltage signal having a sufficient threshold level is applied to a Pockels cell, it rotates the polarization of light passing through the cell. When the voltage signal is removed, the polarization of the light is unaffected. When signal S changes from a high to a low voltage level, Q-switch 18 is pulsed "ON," lasing occurs in optical resonant cavity C-C and a light pulse 26a having a wavelength of about 0.9 µm is emitted out of the cavity through partially reflective mirror 20. When signal S is at a high voltage level, gain builds up in gain element 24 and no lasing occurs in optical resonant cavity C-C. In operation, the voltage level of signal S is preferably pulsed to provide a pulsed output signal 26a having the desired wavelength $\lambda_1$ from the laser cavity C-C.

A characteristic of gain element 24 when implemented as neodymium:YAG (neodymium: yttrium-aluminum-garnet) is a spectral component having relatively low gain at $\lambda_1$=0.946 µm, and relatively high gain centered around 1.06 µm near $\lambda_2$. In case 1, when input signal S is high, Q-switch 18 is "OFF" whereby no lasing occurs in laser cavity C-C. In case 2, when input signal S is low, Q-switch 18 is "ON" and a coherent signal is allowed to build up inside the cavity C-C. If polarizer 16 is perfect, incident, linearly polarized light parallel to the preferred axis of the polarizer is retained in optical resonant cavity C-C along a path 26 generally coincident with optical beam 26; and orthogonally polarized light is rejected from cavity C-C through polarizer 16 as output signal 28. Wave plate 14 is designed to provide 2 full waves of retardation at $\lambda_1$ so that light at $\lambda_1$, passing from polarizer 16 through wave plate 14, reflecting from mirror 12, and passing a second time through wave plate 14, does not suffer any change in polarization and is retained in optical resonant cavity C-C. Wave plate 14 is also designed to provide 1.75 waves of retardation at $\lambda_2$ so that light having wavelength near $\lambda_2$, passing from polarizer 16 through wave plate 14, reflecting from mirror 12, and passing a second time through wave plate 14, is transformed into a polarization state nearly orthogonal to the preferred axis of polarizer 16 and substantially rejected from cavity C-C as output signal 28. Since wave plate 14 is designed to be low-order and have only 1.75 waves of absolute retardation at $\lambda_2$ near the middle of the group of 1 µm high gain lines, filter 15 has a spectrally broad loss centered at $\lambda_2$ which extends over the entire group of 1 µm lines.

The birefringence and refractive index dispersion properties of crystal quartz near 1 µm are such that a plate having a thickness of about 200 µm will provide 2 full waves of retardation near 0.9 µm and 1.75 waves of retardation near 1 µm. Since a 200 µm thick plate is very thin, by way of example, wave plate 14 may more practically be constructed as a compound wave plate using two plates 17 and 19 consisting of crystal quartz each having a thickness of $t_1$ and $t_2$, respectively. Plates 17 and 19 are optically connected to each other and have optical axes rotated by 90 degrees with respect to each other. When constructed in this manner, wave plate 14 operates the same as a single wave plate of thickness equal to the difference, d, in thickness between plates 17 and 19, where d=($t_1$-$t_2$). A filter 15 designed specifically for operating a Nd:YAG laser at 0.946 µm requires a crystal quartz wave plate having an effective thickness, d, of about 215 µm. By way of example as a practical solution, plates 17 and 19 may each have a thickness of 1 mm and 1.215 mm, respectively. The effective thickness of about 215 µm provides exactly 2 full waves of retardation for the $\lambda_1$ component of light beam 26 at 0.946 µm, and 1.75 waves of retardation for the $\lambda_2$ component of light beam 26 at 1.072 um.

Obviously, many modifications and variations of the present invention are possible in light of the above teachings. It is therefore to be understood that within the scope of the appended claims, the invention may be practiced otherwise than as specifically described.

What is claimed is:

1. A Q-switched laser, comprising:
    a first mirror;
    a second mirror;
    an optical gain element for providing gain to a first optical signal centered about an $\lambda_1$ wavelength and to a second optical signal centered about an $\lambda_2$ wavelength;
    an optical retardation element for retarding said first optical signal by a first distance of $2\lambda_1$ for each pass of said first optical signal through said optical retardation element and for retarding said second optical signal by a second distance of $1.75\lambda_2$ for each pass of said second optical signal through said optical retardation element;

a linear polarizer for reflecting said first optical signal between said first and second mirrors to define an optical resonant cavity, and for rejecting said second optical signal from said optical resonant cavity;

a Q-switch for selectively switching between a first state which prevents said first optical signal from resonating in said optical resonant cavity, and a second state which allows said first optical signal to resonate in said optical resonant cavity, whereupon a pulse of said first optical signal is emitted through said second mirror.

2. The Q-switched laser of claim 1 wherein said gain element is a neodymium:YAG gain element.

3. The Q-switched laser of claim 1 wherein said $\lambda_1$ wavelength is about 0.946 µm, and said $\lambda_2$ wavelength is about 1.072 µm.

4. The Q-switched laser of claim 1 wherein said optical retardation element includes:

a first wave plate having a first optical axis; and a second wave plate having a second optical axis perpendicular to said first optical axis.

5. The Q-switched laser of claim 4 wherein:

said $\lambda_1$ wavelength is about 0.946 µm, said first optical signal is retarded by $2\lambda_1$ for each pass of said first optical signal through said optical retardation element, said $\lambda_2$ wavelength is about 1.072 µm, and said second optical signal is retarded by $1.75\lambda_2$ for each pass of said second optical signal through said optical retardation element;

said first wave plate consists essentially of crystalline quartz and has a thickness $t_1$; and said second wave plate consists essentially of crystalline quartz and has a thickness $t_2$;

where $(t_1-t_2) \equiv 215$ µm.

6. The Q-switched laser of claim 1 where said Q-switch is a Pockels cell.

7. A Q-switched laser, comprising:

a first mirror;

a second mirror;

an optical gain element for providing gain to a first optical signal centered about an $\lambda_1$ wavelength and having a $P_1$ polarization, and to a second optical signal centered about an $\lambda_2$ wavelength and having a $P_2$ polarization;

an optical retardation element for transforming said $P_2$ polarization to a $P_3$ polarization that is substantially orthogonal to said $P_1$ polarization;

a linear polarizer for reflecting said first optical signal between said first and second mirrors to define an optical resonant cavity, and for rejecting said second optical signal from said optical resonant cavity; and a Q-switch for selectively switching between a first state which prevents said first optical signal from resonating in said optical resonant cavity, and a second state which allows said first optical signal to resonate in said optical resonant cavity, whereupon a pulse of said first optical signal is emitted through said second mirror, and wherein said $\lambda_1$ wavelength is about 0.946 µm, said first optical signal is retarded by $2\lambda_1$ for each pass of said first optical signal through said optical retardation element, said $\lambda_2$ wavelength is about 1.072 µm, and said second optical signal is retarded by $1.75\lambda_2$ for each pass of said second optical signal through said optical retardation element.

8. The Q-switched laser of claim 7 wherein said gain element is a neodymium:YAG gain element.

9. The Q-switched laser of claim 7 wherein said optical element includes:

a first wave plate having a first optical axis; and a second wave plate having a second optical axis perpendicular to said first optical axis.

10. The Q-switched laser of claim 9 wherein:

said first wave plate consists essentially of crystalline quartz and has a thickness $t_1$; and said second wave plate consists essentially of crystalline quartz and has a thickness $t_2$;

where $(t_1-t_2) \equiv 215$ µm.

11. The Q-switched laser of claim 7 where said Q-switch is a Pockels cell.

12. The Q-switched laser of claim 7 where said second mirror is partially reflective.

13. A Q-switched laser, comprising:

a first mirror;

a second mirror;

an optical gain element for providing gain to a first optical signal centered about an $\lambda_1$ wavelength and a second optical signal centered about an $\lambda_2$ wavelength;

an optical retardation element for retarding said first optical signal by $2\lambda_1$ for each pass of said first optical signal through said optical retardation element, and for retarding said second optical signal by $1.75\lambda_2$ for each pass of said second optical signal through said optical retardation element;

a linear polarizer for reflecting said first optical signal between said first and second mirrors to define an optical resonant cavity, and for rejecting said second optical signal from said optical resonant cavity;

a Q-switch for selectively switching between a first state which prevents said first optical signal from resonating in said optical resonant cavity, and a second state which allows said first optical signal to resonate in said optical resonant cavity, whereupon a pulse of said first optical signal is emitted through said second mirror.

* * * * *